United States Patent [19]
Hansen et al.

[11] Patent Number: 6,023,750
[45] Date of Patent: Feb. 8, 2000

[54] MICROCONTROLLER HAVING DEDICATED HARDWARE FOR MEMORY ADDRESS SPACE EXPANSION VIA AUXILLIARY ADDRESS SIGNAL GENERATION

[75] Inventors: John P. Hansen; Ronald M. Huff, both of Austin, Tex.

[73] Assignee: Advanced Micro Devices, Inc., Sunnyvale, Calif.

[21] Appl. No.: 08/812,551

[22] Filed: Mar. 7, 1997

[51] Int. Cl.[7] .............................. G06F 9/32; G06F 12/06
[52] U.S. Cl. .................... 711/220; 711/200; 711/212; 711/215; 711/5
[58] Field of Search ............... 711/5, 200, 212, 711/215, 220, 216

[56] References Cited

U.S. PATENT DOCUMENTS

| | | | |
|---|---|---|---|
| 4,368,515 | 1/1983 | Nielsen | 711/212 |
| 4,485,457 | 11/1984 | Balaska et al. | 463/45 |
| 4,503,491 | 3/1985 | Lushtak et al. | 711/5 |
| 5,530,818 | 6/1996 | Tagawa | 711/1 |

*Primary Examiner*—B. James Peikari
*Attorney, Agent, or Firm*—Kevin L. Daffer; Conley, Rose & Tayon

[57] ABSTRACT

A microcontroller is presented including additional hardware which generates multiple auxiliary address signals needed to expand the memory address space of the microcontroller. The auxiliary address signals allow access to memory locations within external memory devices which would not otherwise be accessible while advantageously maintaining software compatibility with previous microcontroller products. The auxiliary address signals form the most significant bits of augmented addresses, thereby dividing memory locations within the external memory devices into multiple memory banks of equal size. When memory banking is enabled, software instructions select the desired memory bank by writing appropriate values to address bit positions within a memory banking control (MBC) register. The auxiliary address signals are normally produced having values stored within corresponding bit positions of the MBC register. When address signals are generated which correspond to a portion of the memory address space reserved for operating system software, however, the additional hardware modifies the auxiliary address signals such that a selected memory bank is always accessed. As a result, operating system software need only be present in the selected memory bank. This method of generating the auxiliary address signals eliminates the need to duplicate operating system software in each memory bank mapped to a reserved portion of the memory address space, allowing efficient utilization of the external memory devices.

21 Claims, 4 Drawing Sheets

MICROCONTROLLER HAVING DEDICATED
HARDWARE FOR MEMORY ADDRESS
SPACE EXPANSION VIA AUXILLIARY
ADDRESS SIGNAL GENERATION

CROSS-REFERENCE TO RELATED
APPLICATION

This application relates to co-pending application, Ser. No. 08/813,620 (Attorney Reference No: 5000-84200), filed on the same day as the present application and entitled "MICROCONTROLLER HAVING DEDICATED HARDWARE FOR MEMORY ADDRESS SPACE EXPANSION SUPPORTING BOTH STATIC AND DYNAMIC MEMORY DEVICES" by John P. Hansen and Ronald M. Huff, which is incorporated herein by reference.

BACKGROUND OF THE INVENTION

1. Field of the Invention

This invention relates to the manufacture of integrated circuits and more particularly to the manufacture of microcontrollers.

2. Description of the Relevant Art

A microcontroller is an integrated circuit which incorporates a microprocessor core along with one or more support circuits on the same monolithic semiconductor substrate (i.e., chip). A typical computer system includes a microprocessor secured within its own semiconductor device package and connected to several separately-packaged support circuits. The support circuits perform support functions such as communication functions and memory interface functions. Computer systems which employ microcontrollers may thus be formed using fewer semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives.

A microcontroller is typically coupled to one or more external memory devices which store software programs consisting of instructions and data. During operation, the microcontroller fetches the instructions and data from the external memory devices and operates upon the data during instruction execution. The microprocessor core of the microcontroller typically includes an execution unit coupled to a bus interface unit (BIU). The BIU generates multiple address and control signals used to fetch the instructions and data from the external memory devices, and the execution unit executes those instructions. Each unique combination of the address signals generated by the BIU allows access to a different memory location within the external memory devices. For example, if the BIU generates n address signals, the microcontroller may access $2^n$ unique memory locations.

Due to the widespread acceptance of the x86 microprocessor architecture, many microcontrollers include execution units which execute x86 instructions. While newer microcontrollers incorporate an increased number of support circuits, their execution units remain virtually unchanged in order to maintain backwards compatibility with the vast amount of existing software developed for previous microcontroller products.

There are two basic types of software programs: operating system programs and application programs. An operating system is a collection of software programs which provide file management, input/output control, and a controlled enviromnent for execution of applications programs. MS-DOS® and Windows NT™ (Microsoft Corp.) are common operating systems. An application program is a computer program which performs a specific function, and is typically designed to operate within the controlled environment created by an operating system.

Early x86 microprocessors generate 20 address signals A0–A19. The simultaneous values of the address signals A0–A19 define an address, where A0 is the least significant bit of the binary value of the address and A19 is the most significant bit of the binary value of the address. The 20-bit addresses are generated from a 16-bit "segment" portion and a 16-bit "offset" portion. The segment portion is first shifted four bit positions to the left, then the offset portion is added to the shifted segment portion to form the 20-bit address. With 20 address lines, early x86 microprocessors could generate $2^{20}$ (i.e., 1,048,576) unique combinations of address signals and access $2^{20}$ unique memory locations (i.e., 1,048,576 8-bit bytes of memory, or 1 Mbyte of memory). Newer x86 microprocessors still retain this address generation capability in order to maintain software compatibility. The segment portion is stored in one of several dedicated segment registers which software instructions may read and write. The offset portion is typically generated by the execution unit during instruction execution. Typical microcontrollers based upon the x86 architecture employ this shift-and-add technique to generate 20-bit addresses. The BIU of such microcontrollers typically has special hardware to perform the shift-and-add address generation operation.

The memory address space of a microcontroller generating n address signals extends over $2^n$ consecutive memory locations from memory location 0 to memory location $2^n-1$. For example, the memory address space of a microcontroller having 20 address lines extends from memory location 0 (00000h) to $2^{20}-1$ (i.e., 1,048,575 or FFFFFh). The x86 architecture places certain restrictions upon the contents of memory locations within the memory address space. The x86 architecture reserves portions of the memory address space having the highest and lowest address values for operating system software. A first portion of the memory address having the highest address values (i.e., the uppermost portion of the memory address space) is reserved for software instructions executed following assertion of a RESET signal, system configuration data, and interrupt service routines executed following the reception of interrupt signals. A second portion the memory address space having the lowest address values (i.e., the lowermost portion of the memory address space) is also reserved for operating system software. The first 1,024 bytes of the memory address space (i.e., memory locations 0 through 1,023 or 003FFh) are reserved for an interrupt vector table including 256 4-byte addresses of the entry points of the interrupt service routines corresponding to received interrupt numbers.

Due to the requirement to reserve the uppermost and lowermost portions of the memory address space, microcontrollers employing the x86 architecture typically include a chip select unit (CSU) which generates separate chip select signals for the uppermost and lowermost portions of the memory address space. The CSU typically also generates one or more chip select signals for a middle portion of the memory address space existing between the uppermost and lowermost portions. Only one chip select signal is asserted at any given time, and only memory devices receiving an asserted chip select signal are enabled for the memory access operation in progress. A first non-volatile memory device (e.g., a ROM or a Flash device) typically contains the portion of the operating system software residing in the uppermost portion of the memory address space and receives the corresponding chip select signal. A second volatile memory device (e.g., a RAM device) typically contains the portion of the operating system software allocated to the lowermost portion of the memory address space and receives the corresponding chip select signal. Additional memory devices may contain application programs, and each additional memory device receives a chip select signal designated for the remaining middle portion of the memory address space.

For example, an x86-based microcontroller may be coupled to three different memory devices: a first 256K×8 Flash memory device, a second 256K×8 SRAM memory device, and a third 512K×8 SRAM memory device. The first memory device has 18 address signal terminals MA0–MA17 and contains the portion of the operating system software residing in the uppermost portion of the memory address space. Terminals MA0–MA17 of the first memory device are connected to address signal terminals A0–A17 of the microcontroller, and the first memory device is enabled by a programmed upper chip select signal (UCS#). Chip select signal UCS# is an active low signal as denoted by the '#' symbol following the signal name 'UCS'. Active low signals are asserted when driven to a low logic level and deasserted when driven to a logic high level. The second memory device also has 18 address signal terminals MA0–MA17, and contains the portion of the operating system software residing in the lowermost portion of the memory address space. Terminals MA0–MA17 of the second memory device are also connected to address signal terminals A0–A17 of the microcontroller, and the second memory device is enabled by a programmed lower chip select signal (LCS#). The third memory device has 19 address terminals MA0–MA18 and is allocated for applications programs. Terminals MA0–MA18 of the third memory device are connected to address signal terminals A0–A18 of the microcontroller, and the third memory device is enabled by a programmed middle chip select signal (MCS#). The CSU asserts signal UCS# when address values 786,432 (C0000h) through 1,048,575 (FFFFFh) are driven upon the address signal terminals, asserts signal LCS# when address values 0 (00000h) through 262,143 (3FFFFh) are driven upon the address signal terminals, and asserts signal MCS# when address values 262,144 (40000h) through 786,431 (BFFFFh) are driven upon the address signal terminals.

Application programs tend to grow larger with time as new functions are added. In addition, each hardware support function incorporated within a microcontroller typically requires additional instructions for configuration and operation. At the same time, software compatibility requires that the number of address lines and the method of address signal generation remain the same. As a result, increasing the amount of memory accessible by a microcontroller is a problem often requiring unique solutions.

One common solution has been to replace a "smaller" memory device with a "larger" memory devices having a greater number of memory locations and requiring additional address signals. The microcontroller coupled to the larger memory devices generates additional control signals which function as the additional address signals. Special software is used to generate the additional control signals. The additional control signals typically form the most significant address signals, dividing the larger memory device into multiple sections or "banks" of memory. All of the memory banks created in this fashion have the same number of memory locations (i.e., are the same size). The additional control signals select between the available memory banks, determining which of the memory banks is active.

For example, the third memory device in the above example may be replaced by a 1024K×8 memory device having 20 address signal terminals MA0–MA19. If terminals MA0–MA19 of the third memory device were connected to respective address signal terminals A0–A19 of the microcontroller, the portions of the third memory device which overlap the uppermost and lowermost portions of the memory address space (i.e., half the memory locations within the third memory device) would not be accessible as the MCS# signal would not be asserted during memory accesses involving these portions. However, by connecting terminals MA0–MA18 of the third memory device to respective address signal terminals A0–A18 of the microcontroller and connecting an additional control signal generated by the microcontroller to terminal MA19, the microcontroller may access all of the memory locations within the third memory device. This configuration creates two separate memory banks within the third memory device, each memory bank containing 512K memory locations. Special software executed by the microcontroller is used to generate the additional control signal, thereby selecting between the two memory banks.

The requirement of the x86 architecture to reserve portions of the memory address space creates problems when adding memory devices with capacities which exceed the available chip select ranges and contain memory locations with addresses within (i.e., mapped to) reserved portions of the memory address space. In this case, any of the memory banks mapped to a reserved portion of the memory address space may be active when the RESET signal is asserted or when an interrupt occurs. The most straightforward solution to this problem is also the least desirable: duplicate the applicable operating system software in each memory bank. The RESET signal assertion problem may be overcome by ensuring the additional control signals are driven to a logic high level (i.e., a logic 1) when the RESET signal is asserted. However, each memory bank mapped to the lowermost portion of the memory address space must contain a copy of the 1,024-byte interrupt vector table, and each memory bank mapped to the uppermost portion of the memory address space must include interrupt service routines which are either complete or include enough instructions to switch to a "common" memory bank containing the interrupt service routines.

For example, assume an x86-based microcontroller is coupled to two different memory devices: a first 256K×8 Flash memory device and a second 1,024×8 SRAM memory device. The first memory device has 18 address terminals MA0–MA17 and contains the portion of the operating system software residing in the uppermost portion of the memory address space. Terminals MA0–MA17 of the first memory device are connected to respective address signal terminals A0–A17 of the microcontroller, and the first memory device is enabled by a programmed upper chip select signal (UCS#). The second memory device has 20 address terminals MA0–MA19, and contains the portion of the operating system software residing in the lowermost portion of the memory address space. The remainder of the second memory device is available for application programs.

In order for the microcontroller to access all of the memory locations within the second memory device, terminals MA0–MA18 of the second memory device are connected to respective address signal terminals A0–A18 of the microcontroller, the microcontroller generates an additional control signal connected to terminal MA19, and the second memory device is enabled by a programmed lower chip select signal (LCS#). The CSU asserts signal UCS# when address values 786,432 (C0000h) through 1,048,575 (FFFFFh) are driven upon the address signal terminals, and asserts signal LCS# when address values 0 (00000h) through 524,287 (7FFFFh) are driven upon the address signal terminals. The second memory device contains two memory banks each containing 512K memory locations mapped between address values 0 (00000h) and 524,287 (7FFFFh). Special software executed by the microcontroller generates the additional control signal, thereby selecting between the two memory banks. However, as a result of the requirement of the x86 architecture to reserve portions of the memory address space, both memory banks must contain a copy of the 1,024-byte interrupt vector table in memory locations corresponding to address values 0 (00000h) through 1,023 (003FFh).

It would be beneficial to have a microcontroller which includes additional hardware to generate additional "auxiliary" address signals. When address signals are generated which correspond to an address within a portion of the memory address space reserved for operating system software, the additional hardware would produce auxiliary address signals such that a single memory bank containing the operating system software is always accessed. Such a microcontroller would eliminate the need to duplicate operating system software in each memory bank mapped to a reserved portion of the memory address space, allowing efficient utilization of larger memory devices. Furthermore, software compatibility with previous microcontroller products would be advantageously maintained.

SUMMARY OF THE INVENTION

The problems outlined above are in large part solved by a microcontroller which includes additional hardware which generates multiple auxiliary address signals needed to expand the memory address space of the microcontroller. The auxiliary address signals allow access to memory locations within external memory devices which would not otherwise be accessible while advantageously maintaining software compatibility with previous microcontroller products. The auxiliary address signals form the most significant bits of augmented addresses, thereby dividing memory locations within the external memory devices into multiple memory banks of equal size. When memory banking is enabled, software instructions select the desired memory bank by writing appropriate values to address bit positions within a memory banking control (MBC) register. The auxiliary address signals are normally produced having values stored within corresponding bit positions of the MBC register. When address signals are generated which correspond to a portion of the memory address space reserved for operating system software, however, the additional hardware modifies the auxiliary address signals such that a selected memory bank is always accessed. As a result, operating system software need only be present in the selected memory bank. This method of generating the auxiliary address signals eliminates the need to duplicate operating system software in each memory bank mapped to a reserved portion of the memory address space, allowing efficient utilization of the external memory devices.

The microcontroller includes an execution unit, a bus interface unit (BIU), and a chip select unit (CSU) all coupled to signal lines of a core bus. The execution unit is configured to execute microprocessor instructions, preferably instructions from an x86 instruction set. The BIU includes multiple data buffers and handles all data transfer operations between the microcontroller and one or more external devices coupled to the microcontroller (e.g., memory devices and I/O devices) in accordance with established protocols. During the execution of microprocessor instructions, the execution unit generates output data which represent offset portions of addresses of memory locations from which data is to be read or to which data is to be written. The BIU receives the offset portion of the address via the core bus and combines the offset portion with a segment portion in order to produce multiple address signals corresponding to the address. The CSU receives the BIU address signals via the core bus and uses the BIU address signals to generate several different chip select signals. Each chip select signal is associated with a programmable range of addresses. The CSU asserts a chip select signal when the BIU address signals define an address within the corresponding range of addresses.

The microcontroller also includes an auxiliary address generator (AAG) which generates the auxiliary address signals. The auxiliary address signals are used along with the BIU address signals to access memory locations within one or more external memory devices. Each added auxiliary address signal doubles the number of memory locations which may be accessed within an external memory device using the BIU address signals alone. The auxiliary address signals are used to select a memory bank, and the BIU address signals are used to access the memory locations within the selected memory bank. A subset of the auxiliary address signals may be associated with the uppermost portion of the memory address space, and the remaining auxiliary address signals are associated with the lowermost portion of the memory address space.

When memory banking is enabled, the AAG produces the auxiliary address signals having values stored within corresponding address bit positions of the MBC register. When address signals are generated which correspond to a portion of the memory address space reserved for operating system software, however, the AAG ignores the address bit positions within the MBC register and produces auxiliary address signals having predetermined values. As a result, a selected memory bank within an external memory device is always accessed when address signals are generated which correspond to a portion of the memory address space reserved for operating system software.

The CSU generates two chip select signals associated with an uppermost portion of the memory address space of the microcontroller: UCS0# and UCS1#. Chip select signal UCS1# is terminated at an I/O pad and is used to enable an external memory device. Chip select signal UCS0# is routed to the AAG. The CSU asserts chip select signal UCS0# when an address within the uppermost portion of the memory address space reserved for operating system software is generated. The AAG uses chip select signal UCS0# to generate the auxiliary address signals associated with the uppermost portion of the memory address space. For example, when memory banking is enabled and chip select signal UCS0# is asserted, the AAG ignores the address bits within the MBC register and produces the auxiliary address bits associated with the uppermost portion of the memory address space with predetermined values. For example, when memory banking is enabled and chip select signal UCS0# is asserted, the AAG may produce the auxiliary address bits associated with the uppermost portion of the memory address space with values of 1. As a result, only a selected memory bank within an external memory device is accessed when an address within the uppermost portion of the memory address space reserved for operating system software is generated by the BIU.

The CSU also generates two chip select signals associated with a lowermost portion of the memory address space of the microcontroller: LCS0# and LCS1#. Chip select signal LCS1# is terminated at an I/O pad and is used to enable an external memory device. Chip select signal LCS0# is routed to the AAG. The CSU asserts chip select signal LCS0# when an address within the lowermost portion of the memory address space reserved for operating system software is generated. The AAG uses chip select signal LCS0# to generate the auxiliary address signals associated with the lowermost portion of the memory address space. For example, when memory banking is enabled and chip select signal LCS0# is asserted, the AAG ignores the address bits within the MBC register and produces the auxiliary address bits associated with the lowermost portion of the memory address space with predetermined values. For example, when memory banking is enabled and chip select signal LCS0# is asserted, the AAG may produce the auxiliary address bits associated with the lowermost portion of the memory address space with values of 0. As a result, only a selected memory bank within an external memory device is accessed when an address within the lowermost portion of the memory address space reserved for operating system software is generated by the BIU.

BRIEF DESCRIPTION OF THE DRAWINGS

Other objects and advantages of the invention will become apparent upon reading the following detailed description and upon reference to the accompanying drawings in which.

Figure 1:
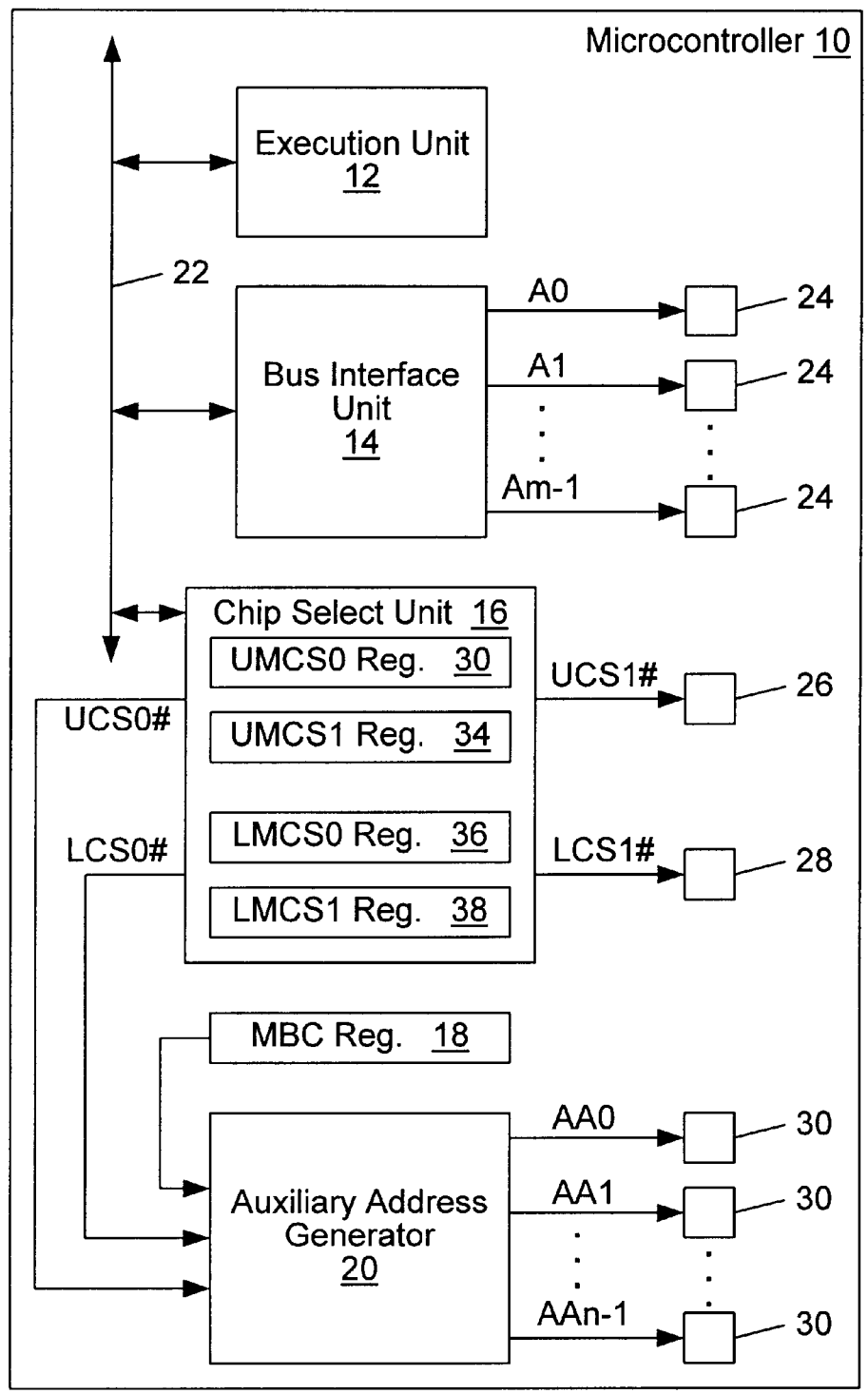
FIG. 1 is a block diagram of a preferred embodiment of a microcontroller of the present invention, wherein the microcontroller includes an execution unit, a bus interface unit (BIU), a chip select unit (CSU), a memory banking control (MBC) register, and an auxiliary address generator (AAG)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of a preferred embodiment of a microcontroller 10 of the present invention. Microcontroller 10 includes an execution unit 12, a bus interface unit (BIU) 14, a chip select unit (CSU) 16, a memory banking control (MBC) register 18, an auxiliary address generator (AAG) 20, a core bus 22, a first set of I/O pads 24, a first I/O pad 26, a second I/O pad 28, and a second set of I/O pads 30, all formed upon a single monolithic semiconductor substrate (i.e., chip). Execution unit 12 executes microprocessor instructions, preferably from an instruction set of an x86 microprocessor. BIU 14 includes multiple data buffers and performs data transfer operations between microcontroller 10 and external devices coupled to microcontroller 10 (e.g., memory devices and I/O devices) in accordance with established protocols. BIU 14 generates m address signals A0–Am−1 during data transfer operations. CSU 16 uses the address signals generated by BIU 14 to generate chip select signals which enable external memory devices during data transfer operations. Core bus 22 includes multiple signal lines. Execution unit 12, BIU 14, and CSU 16 are coupled to core bus 22 and communicate with one another via signals driven upon the signal lines of core bus 22.

During manufacture of microcontroller 10, signal lines to be connected to external devices are terminated at flat metal contact regions (i.e., I/O pads) located upon an exposed surface of the chip. Following manufacture, microcontroller 10 is typically secured within a protective semiconductor device package. Each I/O pad is then connected to a terminal (i.e., pin) of the device package by a signal line (i.e., a wire).

During the execution of microprocessor instructions, execution unit 12 generates output data which represent offset portions of addresses of memory locations from which data is to be read or to which data is to be written. BIU 14 receives the offset portion of the address, combines it with a segment portion, and produces address signals A0–Am−1. The segment portion is typically stored in one of several segment registers within the BIU. Each address signal A0–Am−1 is driven upon a corresponding member of the first set of I/O pads 24. The simultaneous values of address signals A0–Am−1 determine an address of a memory location within an external memory device, and all possible combinations of simultaneous values of address signals A0–Am−1 determine the memory address space of microprocessor 10.

BIU 14 also drives address signals A0–Am−1 upon signals lines of core bus 22. CSU 16 receives address signals A0–Am−1 via core bus 22 and uses the address signals to generate several different chip select signals. Each chip select signal is associated with a programmable range of addresses. CSU 16 asserts a chip select signal when address signals A0–Am−1 define an address within the corresponding range of addresses.

CSU 16 includes an upper memory chip select 0 (UMCS0) register 32, an upper memory chip select 1 (UMCS1) register 34, a lower memory chip select 0 (LMCS0) register 36, and a lower memory chip select 1 (LMCS1) register 38. UMCS0 register 32, UMCS1 register 34, LMCS0 register 36, and LMCS1 register 38 are programmable registers, meaning software instructions may change the contents of any one of these registers by writing a value to an address associated with the target register. CSU 16 uses address range information stored within UMCS0 register 32 to generate an active low upper memory chip select 0 (UCS0#) signal, address range information stored within UMCS1 register 34 to generate an active low upper memory chip select 1 (UCS1#) signal, address range information stored within LMCS0 register 36 to generate an active low lower memory chip select 0 (LCS0#) signal, and address range information stored within LMCS1 register 38 to generate an active low lower memory chip select 1 (LCS1#) signal. Chip select signals UCS1# and LCS1# are driven upon respective first I/O pad 26 and second I/O pad 28.

Address range information stored within UMCS0 register 32 defines an uppermost portion of the memory address space reserved for operating system software, and address range information stored within LMCS0 register 36 defines a lowermost portion of the memory address space reserved for operating system software. CSU 16 thus asserts signal UCS0# when address signals A0–Am−1 correspond to an address within the uppermost portion of the memory address space reserved for operating system software. Similarly, CSU 16 asserts signal LCS0# when address signals A0–Am−1 correspond to an address within the lowermost portion of the memory address space reserved for operating system software.

AAG 20 uses chip select signals UCS0# and LCS0# along with the contents of MBC register 18 to produce n auxiliary address signals AA0–AAn−1, where n≧2. MBC register 18 includes bit positions for storing desired values of corresponding auxiliary address signals (i.e., 0 or 1). Each auxiliary address signal AA0–AAn−1 is driven upon a corresponding member of the second set of I/O pads 30. Auxiliary address signals AA0–AAn−1 are added to address signals A0–Am−1 generated by BIU 14 to form augmented addresses within augmented memory address spaces. Each added auxiliary address signal doubles the number of memory locations which may be accesses using address signals A0–Am−1 alone. One or more auxiliary address signals are used to form the most significant bits of an augmented address. Auxiliary address signals AA0–AAn−1 divide memory locations within an external memory device receiving the address signals into multiple memory banks having equal numbers of memory locations (i.e., of equal size), and address signals A0–Am−1 are used to access the memory locations within each memory bank.

AAG 20 generates auxiliary address signals AA0–AAn−1 such that when BIU 14 generates address signals A0–Am−1 corresponding to a portion of the memory address space reserved for operating system software, the augmented address accesses only one of the multiple memory banks. AAG 20 thus eliminates the need to duplicate operating system software in each memory bank mapped to a portion of the memory address space reserved for operating system software, allowing larger memory devices having a greater number of memory locations to be used efficiently.

Figure 2:
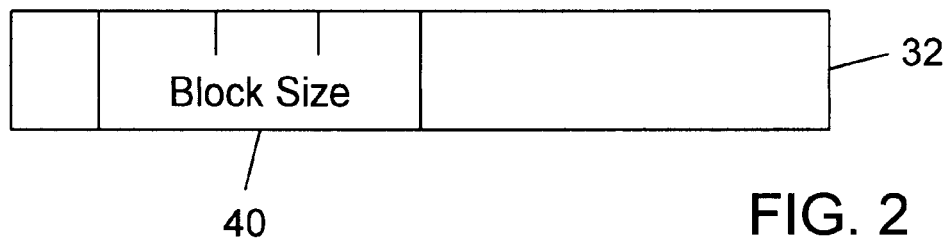
FIG. 2 is a block diagram of a preferred embodiment of a UMCS0 register within the CSU, wherein the UMCS0 register includes a block size field for storing address range information relating to an uppermost portion of the microcontroller memory address space reserved for operating system software.

FIG. 2 is a block diagram of a preferred embodiment of UMCS0 register 32. UMCS0 register 32 includes a block size field 40 occupying three contiguous bit positions of UMCS0 register 32. Block size field 40 defines a portion of the memory address space of microcontroller 10 extending from the highest address value (i.e., all address signals A0–Am−1 having a value of 1) down to a lower boundary defined by the size of a memory block. Table 1 below shows preferred block size field 40 encoding information for a microcontroller generating 20 address signals A0–A19 and having a corresponding 1 Mbyte memory address space.

TABLE 1

UMCS0 Block Size Field Programming Values.

| Block Size Field Contents | Memory Block Size | | Corresponding Lower Boundary |
|---|---|---|---|
| 000 | 512K | | 80000h |
| 001 | — | (Reserved) | — |
| 010 | — | (Reserved) | — |
| 011 | — | (Reserved) | — |
| 100 | 256K | | C0000h |
| 101 | — | (Reserved) | — |
| 110 | 168K | | E0000h |
| 111 | 64K | | F0000h |

Figure 3:
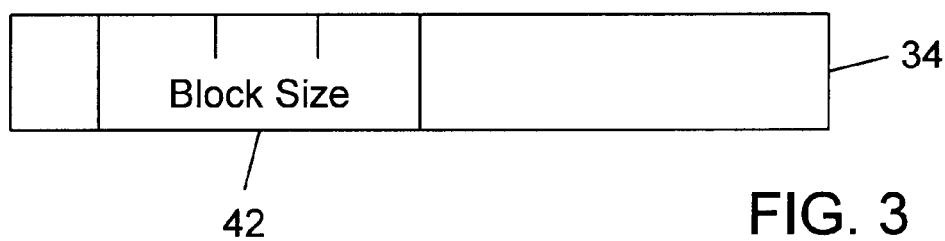
FIG. 3 is a block diagram of a preferred embodiment of a UMCS1 register within the CSU, wherein the UMCS1 register includes a block size field for storing address range information relating to memory locations within an external memory device coupled to the microcontroller and mapped to the uppermost portion of the microcontroller memory address space.

FIG. 3 is a block diagram of a preferred embodiment of UMCS1 register 34. UMCS1 register 34 includes a block size field 42 occupying three contiguous bit positions of UMCS1 register 34. Block size field 42 defines a portion of the memory address space of microcontroller 10 extending from the highest address value (i.e., all address signals A0–Am−1 having a value of 1) down to a lower boundary defined by the size of a memory block. The portion of the address space defined by block size field 42 must be greater than or equal to the portion of the address space defined by block size field 40 of UMCS0 register 32. Table 2 below shows preferred block size field 42 encoding information for a microcontroller generating 20 address signals A0–A19 and having a corresponding 1 Mbyte memory address space.

TABLE 2

UMCS1 Block Size Field Programming Values.

| Block Size Field Contents | Memory Block Size | | Corresponding Lower Boundary |
|---|---|---|---|
| 000 | 512K | | 80000h |
| 001 | — | (Reserved) | — |
| 010 | — | (Reserved) | — |
| 011 | — | (Reserved) | — |
| 100 | 256K | | C0000h |
| 101 | — | (Reserved) | — |
| 110 | 168K | | E0000h |
| 111 | 64K | | F0000h |

Figure 4:
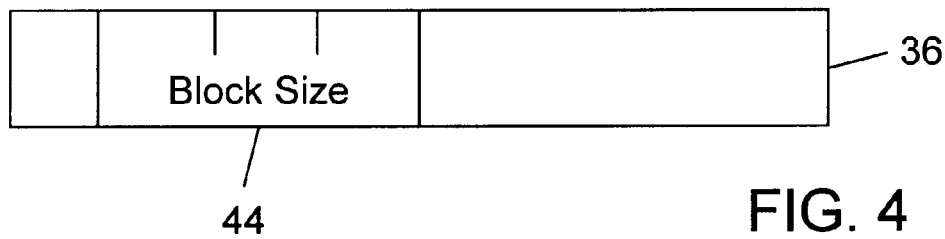
FIG. 4 is a block diagram of a preferred embodiment of an LMCS0 register of the CSU, wherein the LMCS0 register includes a block size field for storing address range information relating to a lowermost portion of the microcontroller memory address space reserved for operating system software.

FIG. 4 is a block diagram of a preferred embodiment of LMCS0 register 36. LMCS0 register 36 includes a block size field 44 occupying three contiguous bit positions of LMCS0 register 36. Block size field 44 defines a portion of the memory address space of microcontroller 10 extending from the lowest address value (i.e., all address signals A0–Am−1 having a value of 0) to an upper boundary defined by the size of a memory block. Block size field 44 preferably contains encoded information relating the memory block size as shown in Table 3 below.

TABLE 3

LMCS0 Block Size Field Programming Values.

| Block Size Field Contents | Memory Block Size | | Corresponding Upper Boundary |
|---|---|---|---|
| 000 | 64K | | 0FFFFh |
| 001 | 168K | | 1FFFFh |
| 010 | — | (Reserved) | — |
| 011 | 256K | | 3FFFFh |
| 100 | — | (Reserved) | — |
| 101 | — | (Reserved) | — |
| 110 | — | (Reserved) | — |
| 111 | 512K | | 7FFFFh |

Figure 5:
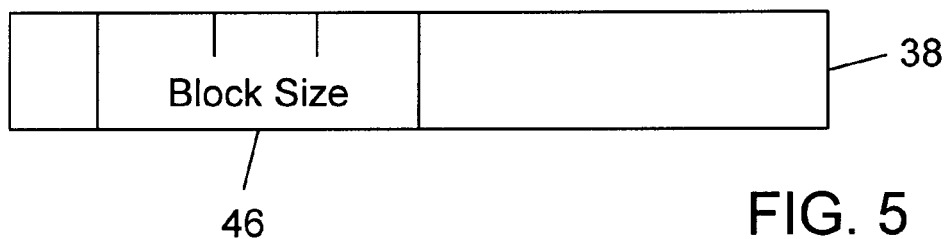
FIG. 5 is a block diagram of a preferred embodiment of an LMCS1 register within the CSU, wherein the LMCS1 register includes a block size field for storing address range information relating to memory locations within an external memory device coupled to the microcontroller and mapped to the lowermost portion of the microcontroller memory address space.

FIG. 5 is a block diagram of a preferred embodiment of LMCS1 register 38. LMCS1 register 38 includes a block size field 46 occupying three contiguous bit positions of LMCS0 register 38. Block size field 46 defines a portion of the memory address space of microcontroller 10 extending from the lowest address value (i.e., all address signals A0–Am−1 having a value of 0) to an upper boundary defined by the size of a memory block. The portion of the address space defined by block size field 46 must be greater than or equal to the portion of the address space defined by block size field 44 of LMCS0 register 36. Block size field 46 preferably contains encoded information relating the memory block size as shown in Table 4 below.

TABLE 4

LMCS1 Block Size Field Programming Values.

| Block Size Field Contents | Memory Block Size | | Corresponding Upper Boundary |
|---|---|---|---|
| 000 | 64K | | 0FFFFh |
| 001 | 168K | | 1FFFFh |
| 010 | — | (Reserved) | — |
| 011 | 256K | | 3FFFFh |
| 100 | — | (Reserved) | — |

TABLE 4-continued

LMCS1 Block Size Field Programming Values.

| Block Size Field Contents | Memory Block Size | | Corresponding Upper Boundary |
|---|---|---|---|
| 101 | — | (Reserved) | — |
| 110 | — | (Reserved) | — |
| 111 | 512K | | 7FFFFh |

Figure 6:
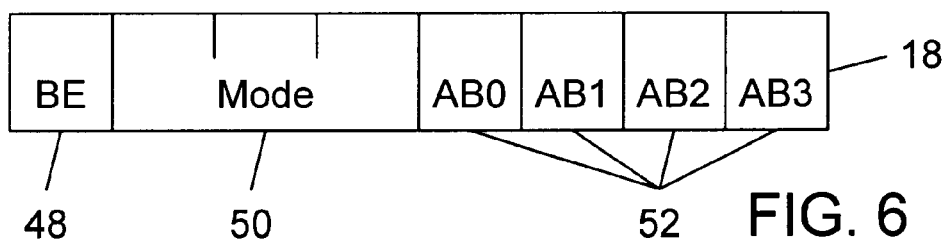
FIG. 6 is a block diagram of a preferred embodiment of the MBC register of FIG. 1, wherein the MBC register includes multiple bit positions for storing desired auxiliary address signal values.

FIG. 6 is a block diagram of a preferred embodiment of MBC register 18. MBC register 18 is programmable, and includes a single banking enable (BE) bit 48, a mode field 50 occupying three contiguous bit positions, and four address bits AB0–AB3 (labeled 52) corresponding to four respective auxiliary address signals AA0–AA3. Memory banking is enabled when BE bit 48 is a 1, and is disabled when BE bit 48 is a 0. AB0–AB3 contain the values of AA0–AA3 to be generated, thus defining a memory bank to be accessed as described above. The contents of the three bit positions of mode field 50 determine whether AB0–AB3 apply to a memory device mapped to the uppermost portion (U) or the lowermost portion (L) of the memory address space of microprocessor 10 per Table 5 below.

TABLE 5

MBC Register Mode Field Programming Values.

| Mode Field Contents | Applies To Memory Device Mapped To: | | | |
|---|---|---|---|---|
| | AB0 | AB1 | AB2 | AB3 |
| 000 | U | U | U | U |
| 001 | U | U | U | L |
| 010 | U | U | L | L |
| 011 | U | L | L | L |
| 100 | L | L | L | L |
| 101 | — | — | — | — |
| 110 | — | — | — | — |
| 111 | — | — | — | — |

When memory banking is enabled and chip select signals UCS0# and LCS0# are deasserted, AAG 20 produces AA0–AA3 with the values stored within bits AB0–AB3 (labeled 52) of MBC register 18. Software instructions executed by execution unit 12 select desired memory banks within external memory devices coupled to microprocessor 10 by storing appropriate values within bits AB0–AB3 (labeled 52) of MBC register 18. When address signals A0–Am−1 indicating an address within the uppermost portion of the memory address space reserved for operating system software are generated by BIU 14, CSU 16 asserts chip select signal UCS0#. When chip select signal UCS0# is asserted, AAG 20 ignores the contents of bits AB0–AB3 (labeled 52) of MBC register 18 and produces the subset of auxiliary address bits AA0–AA3 associated with the uppermost portion of the memory address space with predetermined values. For example, when memory banking is enabled and chip select signal UCS0# is asserted, AAG 20 may produce the subset of auxiliary address bits AA0–AA3 associated with the uppermost portion of the memory address space with values of 1. As a result, operating system software need only reside within one of the memory banks mapped to the uppermost portion of the memory address space, and the corresponding portions of all other memory banks mapped to the uppermost portion of the memory address space are thus made available for application programs.

When an address within the lowermost portion of the memory address space reserved for operating system software is generated by BIU 14, CSU 16 asserts chip select signal LCS0#. When memory banking is enabled and chip select signal LCS0# is asserted, AAG 20 ignores the contents of bits AB0–AB3 (labeled 52) of MBC register 18 and produces the subset of address bits AA0–AA3 associated with the lowermost portion of the memory address space with predetermined values. For example, when memory banking is enabled and chip select signal LCS0# is asserted, AAG 20 may produce the subset of auxiliary address bits AA0–AA3 associated with the lowermost portion of the memory address space with values of 0. As a result, operating system software need only reside within one of the memory banks mapped to the lowermost portion of the memory address space, and the corresponding portions of all other memory banks mapped to the lowermost portion of the memory address space are thus made available for application programs.

It is noted that microcontroller 10 may include a direct memory access (DMA) unit having multiple DMA channels, each DMA channel being capable of transferring data between two different address ranges within the memory address space of microcontroller 10 without involving execution unit 12. In this case, microcontroller 10 preferably includes additional memory banking registers similar to MBC register 18 to facilitate DMA data transfer operations. AAG 20 selects between the multiple memory banking registers, using values stored within one of the multiple memory banking registers to produce AA0–AA3 when memory banking is enabled and chip select signals UCS0# and LCS0# are deasserted.

Figure 7:
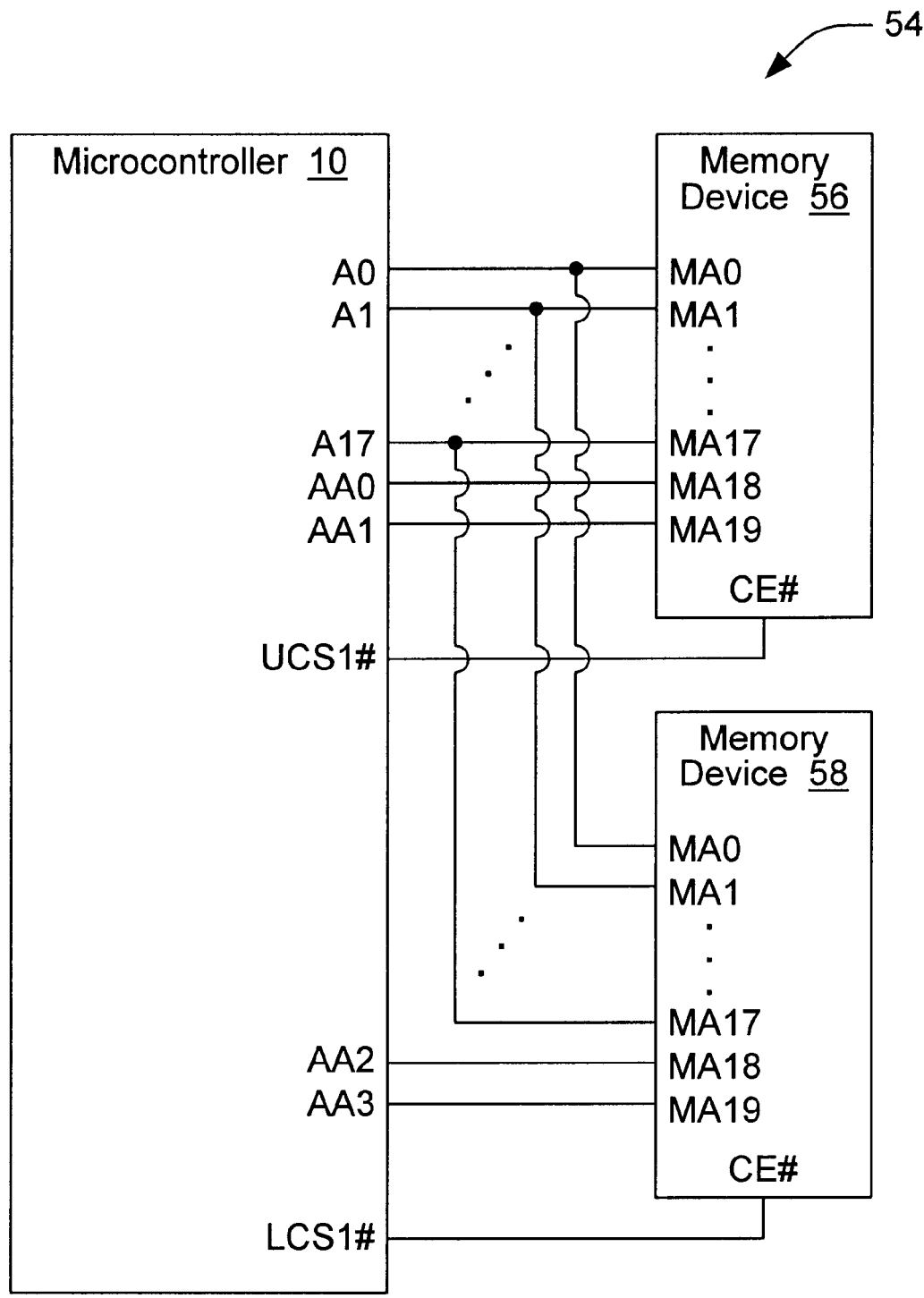
FIG. 7 is a block diagram of a computer system including the microcontroller of FIG. 1 coupled to a first and second external memory devices, wherein two auxiliary address signals AA0 and AA1 allow access to all memory locations within the first external memory device, and wherein two auxiliary address signals AA2 and AA3 allow access to all memory locations within the second external memory device.

FIG. 7 will now be used to further describe microcontroller 10 by way of an illustrative example application. FIG. 7 is a block diagram of a computer system 54 including microcontroller 10. Microcontroller 10 is coupled to a first memory device 56 and a second memory device 58. Memory device 56 may be, for example, a 1024×8 Flash memory device having 20 address terminals MA0–MA19 and a chip enable terminal CE#. Memory device 58 may be, for example, a 1024×8 SRAM memory device also having 20 address terminals MA0–MA19 and a chip enable terminal CE#. Microcontroller 10 generates 20 address signals A0–A19, but only the first 18 address signals A0–A17 are used. Memory device 56 is mapped to the uppermost 512K portion of the 1 Mbyte memory address space of microcontroller 10 by the contents of UMCS1 register 34. Memory device 58 is mapped to the lowermost 512K portion of the 1 Mbyte memory address space of microcontroller 10 by the contents of LMCS1 register 38. Address terminals MA0–MA17 of both memory device 56 and memory device 58 are coupled to respective address signals A0–A17 generated by microcontroller 10. Chip enable terminal CE# of memory device 56 is coupled to chip select signal UCS1# generated by microcontroller 10, and chip enable terminal CE# of memory device 58 is coupled to chip select signal LCS1# generated by microcontroller 10. Auxiliary address signals AA0 and AA1 generated by microcontroller 10 are mapped to the uppermost portion of the address space by the contents of MBC register 18 and are coupled to address terminals MA18 and MA19, respectively, of memory device 56. Auxiliary address signals AA2 and AA3 generated by microcontroller 10 are mapped to the lowermost portion of the address space by the contents of MBC register 18 and coupled to address terminals MA18 and MA19, respectively, of memory device 58. Memory devices 56 and 58 also include data terminals MD0–MD7 (not shown) respectively coupled to data signals D0–D7 (not shown) of microcontroller 10.

Figure 8:
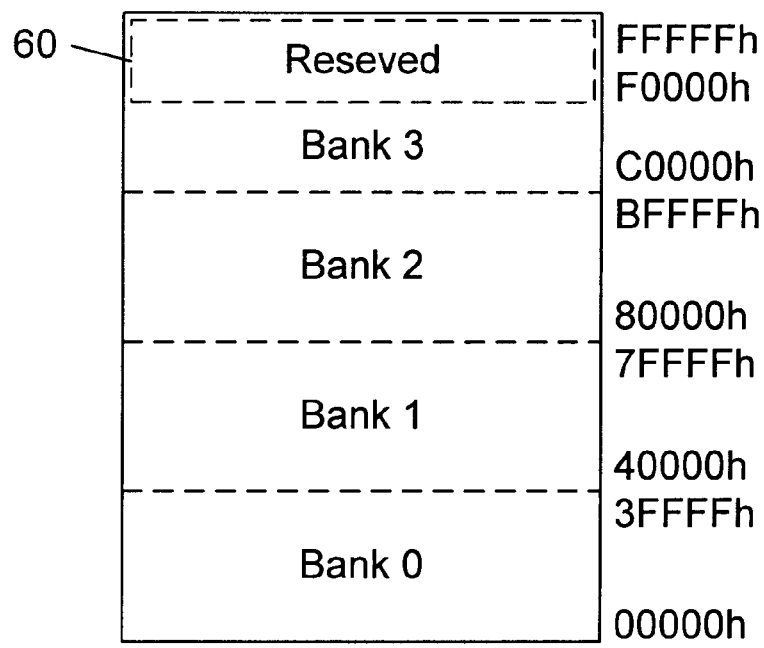
FIG. 8 is a block diagram of a memory map of the first memory device of FIG. 7, wherein the auxiliary address signals AA0 and AA1 divide the memory locations within the first memory device into four memory banks 0–3 each having an equal number of memory locations, and wherein only a reserved portion of memory bank 3 is accessed when an address within the uppermost portion of the memory address space reserved for operating system software is generated.

FIG. 8 is a block diagram of a memory map of first memory device 56. FIG. 8 illustrates how auxiliary address signals AA0 and AA1, generated by AAG 20, divide the memory locations within memory device 56 into four memory banks 0–3 each containing 256K memory locations. The memory locations within each memory bank are mapped to the uppermost portion of the memory address space of microcontroller 10 and accessible using the 18 address signals A0–A17. Software instructions executed by execution unit 12 select the desired memory bank by storing values within bits AB0–AB1 of MBC register 18 according to Table 6 below.

TABLE 6

Values of AA0 and AA1 and Selected Memory Bank.

| AA0 | AA1 | Memory Bank Selected |
|---|---|---|
| 0 | 0 | Bank 0 |
| 0 | 1 | Bank 1 |
| 1 | 0 | Bank 2 |
| 1 | 1 | Bank 3 |

When an address within the uppermost portion of the memory address space reserved for operating system software is generated by BIU 14, CSU 16 asserts chip select signal UCS0#. Upon receiving the asserted UCS0# signal, AAG 20 ignores the contents of AB0 and AB1 within MBC register 18 and produces AA0 and AA1 with values of 1. Thus reserved portion 60 of bank 3 of memory device 56 is always accessed when an address within the uppermost portion of the memory address space is generated by BIU 14, regardless of the contents of AB0 and AB1 within MBC register 18. As a result, operating system software residing within bank 3 need not be duplicated within banks 0–2, freeing up the corresponding portions of banks 0–2 for applications programs.

Figure 9:
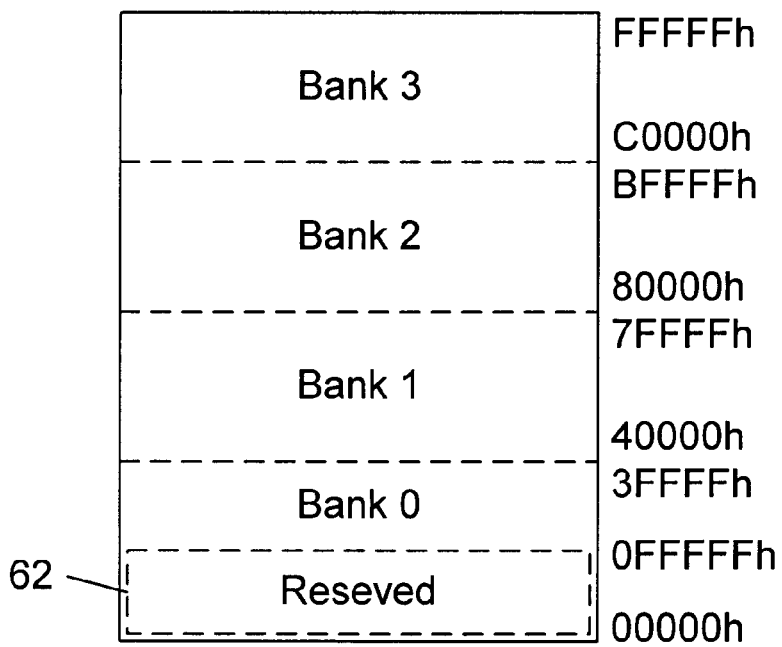
FIG. 9 is a block diagram of a memory map of the second memory device of FIG. 7, wherein the auxiliary address signals AA2 and AA3 divide the memory locations within the second memory device into four memory banks 0–3 each having an equal number of memory locations, and wherein only a reserved portion of memory bank 0 is accessed when an address within the lowermost portion of the memory address space reserved for operating system software is generated.

FIG. 9 is a block diagram of a memory map of second memory device 58. FIG. 9 illustrates how auxiliary address signals AA2 and AA3, also generated by AAG 20, divide up the augmented address space associated with memory device 58 into four memory banks 0–3 each containing 256K memory locations. The memory locations within each memory bank are mapped to the lowermost portion of the memory address space of microcontroller 10 and are accessible using the first 18 address signals A0–A17. Software instructions executed by execution unit 12 select the desired memory bank by storing values within bits AB2–AB3 of MBC register 18 according to Table 7 below.

TABLE 7

Values of AA2 and AA3 and Selected Memory Bank.

| AA2 | AA3 | Memory Bank Selected |
|---|---|---|
| 0 | 0 | Bank 0 |
| 0 | 1 | Bank 1 |
| 1 | 0 | Bank 2 |
| 1 | 1 | Bank 3 |

When an address within the lowermost portion of the memory address space reserved for operating system software is generated by BIU 14, CSU 16 asserts chip select signal LCS0# as described above. Upon receiving the asserted 1CS0# signal, AAG 20 ignores the contents of bits AB2 and AB3 within MBC register 18 and produces AA2 and AA3 with values of 0. Thus reserved portion 62 of bank 0 is always accessed when an address within the lowermost portion of the memory address space is generated by BIU 14, regardless of the contents of bits AB2 and AB3 within MBC register 18. As a result, operating system software residing within bank 0 need not be duplicated within banks 1–3 of memory device 58, freeing up the corresponding portions of banks 1–3 for applications programs.

It will be appreciated by those skilled in the art having the benefit of this disclosure that this invention is believed to be a microcontroller which includes additional hardware which generates multiple auxiliary address signals needed to expand the memory address space of the microcontroller. When an address is generated within a portion of the memory address space reserved for operating system software, the additional hardware produces the auxiliary address signals such that a selected memory bank is always accessed. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microcontroller, comprising:
   a bus interface unit coupled to produce an address signal;
   a chip select unit coupled to produce a first chip select signal in response to said address signal such that said first chip select signal is asserted when said address signal falls within a first predefined range of addresses; and
   an auxiliary address generator coupled to receive said first chip select signal and configured to generate a plurality of auxiliary address signals dependent upon said first chip select signal;
   wherein said auxiliary address signals are generated substantially simultaneously with the address signal and combined with the address signal to form an augmented address signal used to access data stored within a memory system, and wherein said auxiliary address signals form a most significant portion of the augmented address signal such that said auxiliary address signals divide a memory address space defined by said augmented address signal into a plurality of banks; and
   wherein said auxiliary address signals select a single one of the plurality of banks when said first chip select signal is asserted, and wherein said address signal is active within the single one of the plurality of banks when said first chip select signal is asserted.

2. The microcontroller as recited in claim 1, wherein said chip select unit comprises a programmable chip select register encompassing a set of bit positions which define said first predefined range of addresses, and wherein said first predefined range of addresses is reserved for code used to configure said microcontroller.

3. The microcontroller as recited in claim 1, wherein said plurality of banks are of substantially equal size.

4. The microcontroller as recited in claim 1, wherein said chip select unit is further configured to produce a second chip select signal in response to said address signal such that said second chip select signal is asserted when said address signal falls within a second predefined range of addresses, and wherein said auxiliary address generator is coupled to receive the second chip select signal and further configured to generate said plurality of auxiliary address signals such that said auxiliary address signals select another one of the plurality of banks when said second chip select signal is asserted.

5. The microcontroller as recited in claim 1, wherein the address signal produced from the bus interface unit is adapted for accessing memory locations within the memory address space.

6. The microcontroller as recited in claim 5, wherein said auxiliary address generator produces at least two auxiliary address signals, each one of which doubles the number of said memory locations accessed by the address signal.

7. The microcontroller as recited in claim 6, wherein each of the auxiliary address signals selects between two banks which share the same address range within the memory address space.

8. The microcontroller as recited in claim 2, wherein said code comprises instructions and data for configuring the microcontroller after reset or interrupt of the microcontroller.

9. The microcontroller as recited in claim 1, further comprising:
   a memory banking control register; and
   said auxiliary address generator coupled to generate said plurality of auxiliary address signals arising from values stored within the memory banking control register during times when the first chip select signal is deasserted.

10. The microcontroller as recited in claim 1, wherein during times when the first chip select signal is asserted, the auxiliary address generator generates said plurality of auxiliary address signals such that each auxiliary address signal has a predefined value.

11. A computer system, comprising:
    a bus interface unit coupled to produce a plurality of address signals in response to output data forwarded from an execution unit;
    a chip select unit coupled to receive the plurality of address signals and produce an internal chip select signal in response thereto;
    an auxiliary address generator coupled to receive the internal chip select signal and configured to generate a plurality of auxiliary address signals dependent upon said internal chip select signal, wherein said auxiliary address signals are generated substantially simultaneously with said address signals, and wherein said auxiliary address signals are combined with the address signals to form an augmented address signal, and wherein said auxiliary address signals form a most significant portion of the augmented address signal; and
    a memory partitioned by said auxiliary address signals into a plurality of memory banks, wherein a single memory bank containing code for configuring the computer system is addressable by the augmented address signal during times when the internal chip select signal is asserted.

12. The computer system as recited in claim 11, further comprising a core bus interconnected between the bus interface unit and the chip select unit.

13. The computer system as recited in claim 11, wherein the chip select unit comprises a programmable chip select register, and wherein the chip select register comprises a plurality of bit positions which define a range of addresses reserved for the code for configuring the computer system.

14. The computer system as recited in claim 11, further comprising a programmable memory banking control register coupled to the auxiliary address generator, wherein the auxiliary address generator uses the contents of the memory banking control register along with the internal chip select signal to generate the plurality of auxiliary address signals.

15. The computer system as recited in claim 14, wherein the memory banking control register includes a plurality of address bit positions for storing desired values of the plurality of auxiliary address signals, and wherein each of the plurality of address bit positions corresponds to a member of the plurality of auxiliary address signals.

16. The computer system as recited in claim 15, wherein when the internal chip select signal is deasserted the auxiliary address generator generates each of the plurality of auxiliary address signals with a value equal to the contents of the corresponding member of the plurality of address bit positions within the memory banking control register.

17. The computer system as recited in claim 15, wherein when the internal chip select signal is asserted the auxiliary address generator generates each of the plurality of auxiliary address signals with a predetermined value such that the bank containing code for configuring the computer system is accessed.

18. A method for accessing code for configuring a programmable device, comprising:

partitioning a memory device into a plurality of banks, a target bank of said plurality of banks containing said code;

asserting a chip select signal if access to said code is desired; and dispatching an augmented address signal, wherein said augmented address signal includes a plurality of auxiliary address signals and a plurality of address signals, and wherein the auxiliary address signals are used to select one of said plurality of banks, and wherein the address signals are used to access a memory location within the selected bank, and wherein if said chip select signal is asserted the auxiliary address signals select said target bank and the address signals access a memory location within said target bank.

19. The method as recited in claim 18, comprising setting a set of pre-defined values upon the auxiliary address signals and forwarding those values to select a bank dissimilar from the target bank if said chip select signal is deasserted.

20. The method as recited in claim 18, wherein said pre-defined values are programmably stored within and retrieved from a memory banking control register.

21. A microcontroller, comprising:

a bus interface unit coupled to produce an address signal;

a chip select unit coupled to produce a first chip select signal in response to said address signal such that said first chip select signal is asserted when said address signal falls within a first predefined range of addresses;

a memory banking control register;

an auxiliary address generator coupled to receive said first chip select signal and configured to generate a plurality of auxiliary address signals dependent upon said first chip select signal;

wherein said auxiliary address signals are generated substantially simultaneously with the address signal and combined with the address signal to form an augmented address signal used to access data stored within a memory system, and wherein said auxiliary address signals form a most significant portion of the augmented address signal such that said auxiliary address signals divide a memory address space into a plurality of banks; and wherein said auxiliary address signals select a single one of the plurality of banks when said first chip select signal is asserted, and wherein said auxiliary address signals arise from values stored within the memory banking control register when said first chip select signal is deasserted, and wherein said address signal is active within the single one of the plurality of banks when said first chip select signal is asserted.

* * * * *